United States Patent
Kondo et al.

(10) Patent No.: US 7,623,686 B2
(45) Date of Patent: Nov. 24, 2009

(54) TECHNIQUES AND APPARATUS FOR INCREASING ACCURACY OF IRIS AUTHENTICATION BY UTILIZING A PLURALITY OF IRIS IMAGES

(75) Inventors: Kenji Kondo, Kyoto (JP); Takeo Azuma, Kyoto (JP); Masahiro Wakamori, Kanagawa (JP)

(73) Assignee: Panasonic Corporation, Osaka (JP)

( * ) Notice: Subject to any disclaimer, the term of this patent is extended or adjusted under 35 U.S.C. 154(b) by 509 days.

(21) Appl. No.: 11/172,640

(22) Filed: Jul. 1, 2005

(65) Prior Publication Data

US 2005/0249385 A1 Nov. 10, 2005

Related U.S. Application Data

(63) Continuation of application No. PCT/JP2005/008219, filed on Apr. 28, 2005.

(30) Foreign Application Priority Data

May 10, 2004 (JP) ............................. 2004-139778

(51) Int. Cl.
*G06K 9/00* (2006.01)
(52) U.S. Cl. .................. 382/117; 382/115; 382/116; 382/118; 351/200
(58) Field of Classification Search ............... 382/115, 382/116, 117, 118; 351/200
See application file for complete search history.

(56) References Cited

U.S. PATENT DOCUMENTS

| | | | | |
|---|---|---|---|---|
| 4,641,349 | A | * | 2/1987 | Flom et al. ................. 382/117 |
| 5,130,667 | A | | 7/1992 | Chang et al. |
| 5,291,560 | A | | 3/1994 | Daugman |
| 6,205,233 | B1 | * | 3/2001 | Morley et al. .............. 382/103 |
| 6,289,113 | B1 | * | 9/2001 | McHugh et al. ............ 382/117 |
| 7,092,555 | B2 | * | 8/2006 | Lee et al. ................... 382/118 |
| 7,155,035 | B2 | * | 12/2006 | Kondo et al. ............... 382/117 |

FOREIGN PATENT DOCUMENTS

| | | |
|---|---|---|
| EP | 1 457 926 A1 | 9/2004 |
| JP | 5-84166 | 12/1993 |
| JP | 05-84166 B2 | 12/1993 |
| JP | 08-504979 A | 5/1996 |
| JP | 2000-194855 A | 7/2000 |
| JP | 2001-167279 A | 6/2001 |
| JP | 2004-167227 A | 6/2004 |
| WO | 86/05018 | 8/1986 |

* cited by examiner

*Primary Examiner*—Brian Q Le
*Assistant Examiner*—Edward Park
(74) *Attorney, Agent, or Firm*—Harness, Dickey & Pierce, P.L.C.

(57) ABSTRACT

A plurality of iris images are acquired (SA0), and aggregation of iris images of which distribution of pupil openings is uniform is acquired from the plurality of iris images by duplication and/or deletion (SA1). Features are generated from the respective iris images that belong to the aggregation (SA2), and a predetermined number of registration features are selected from the features, using authentication performance as an evaluation index.

4 Claims, 15 Drawing Sheets

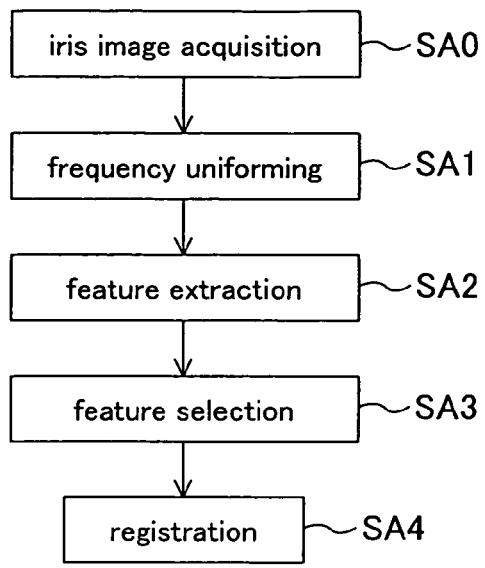
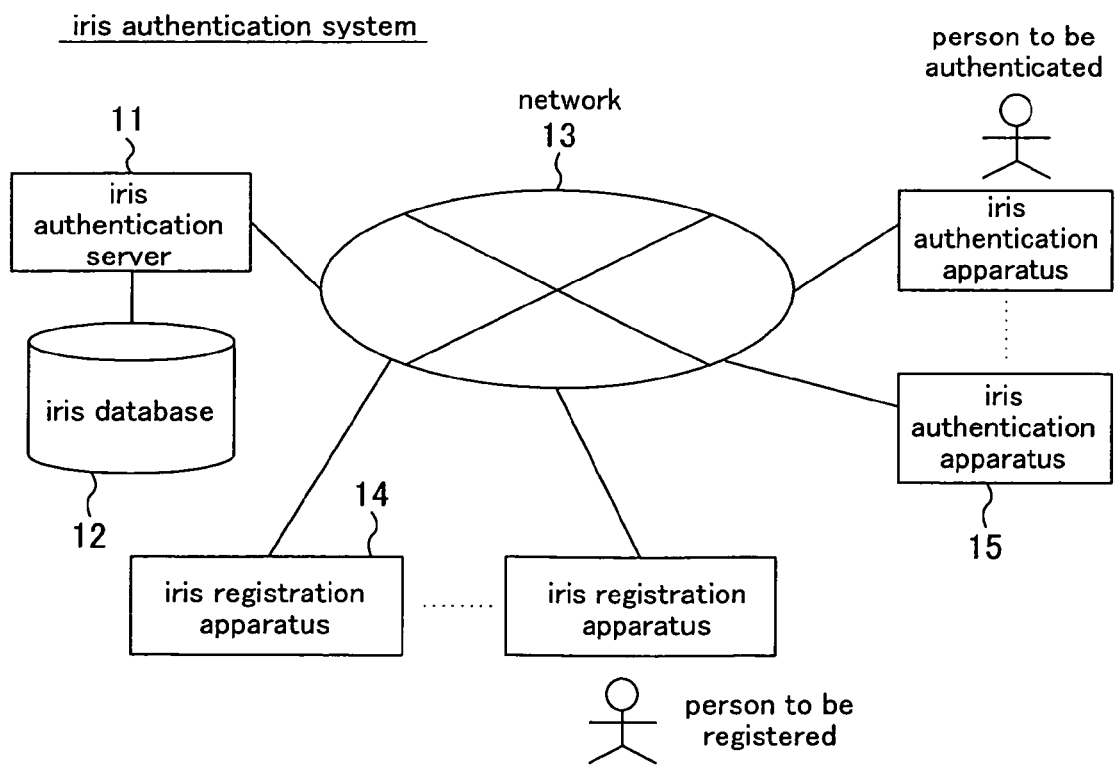

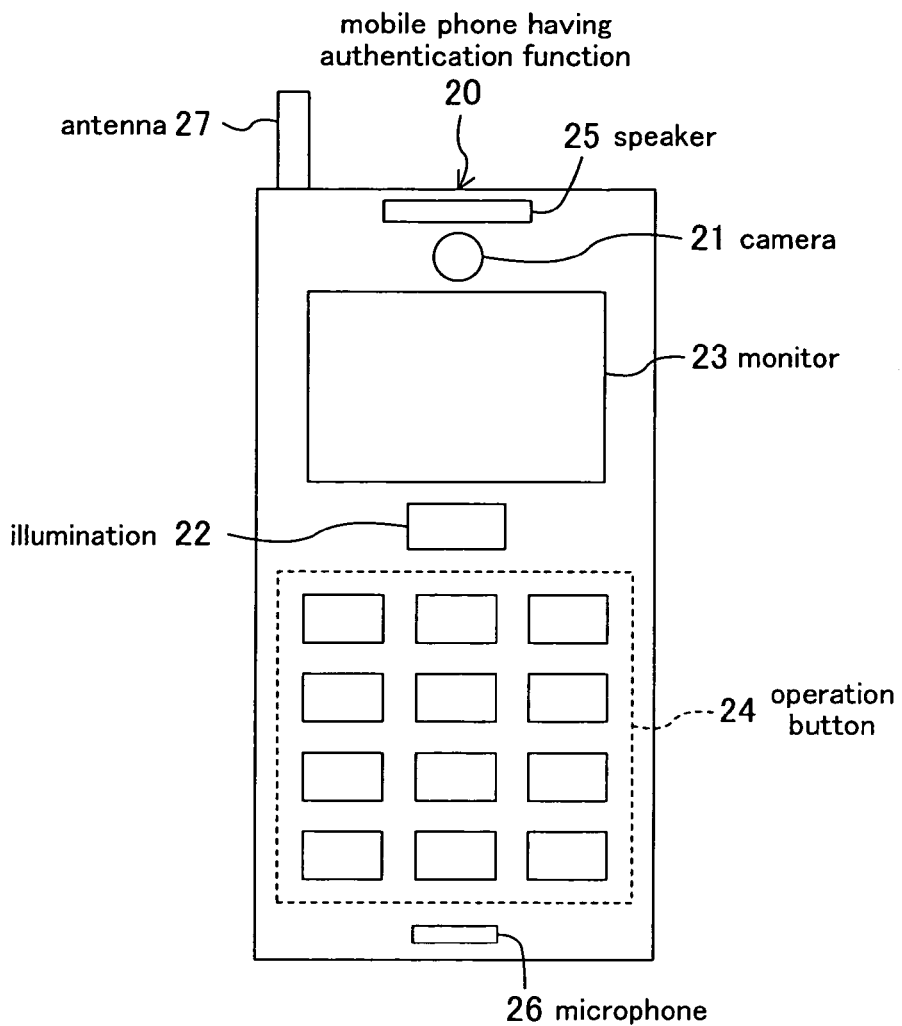

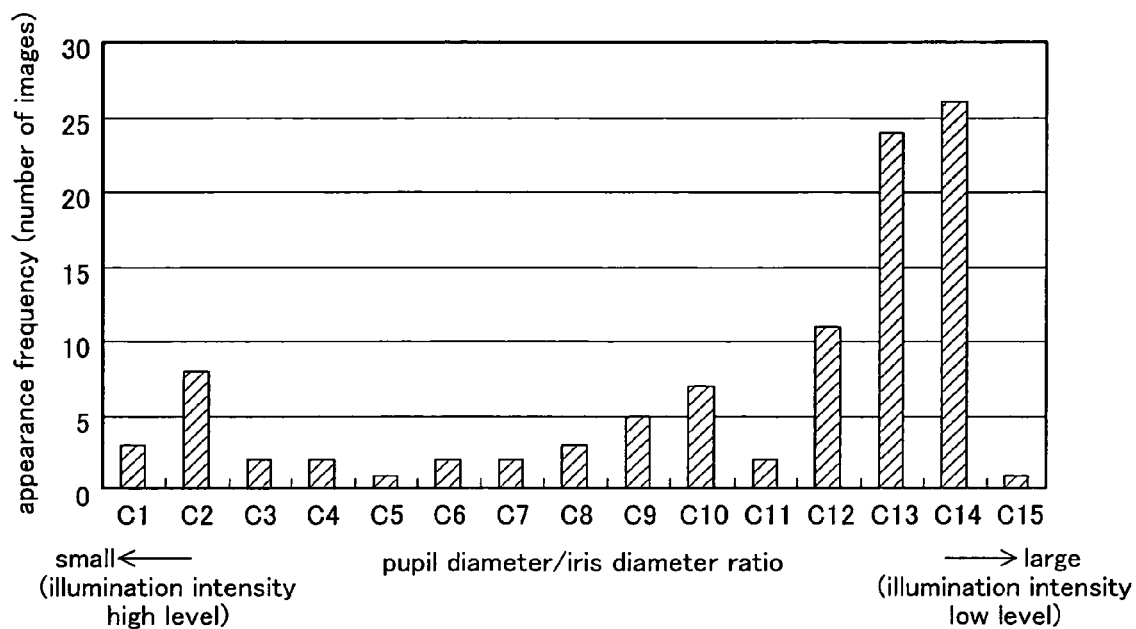
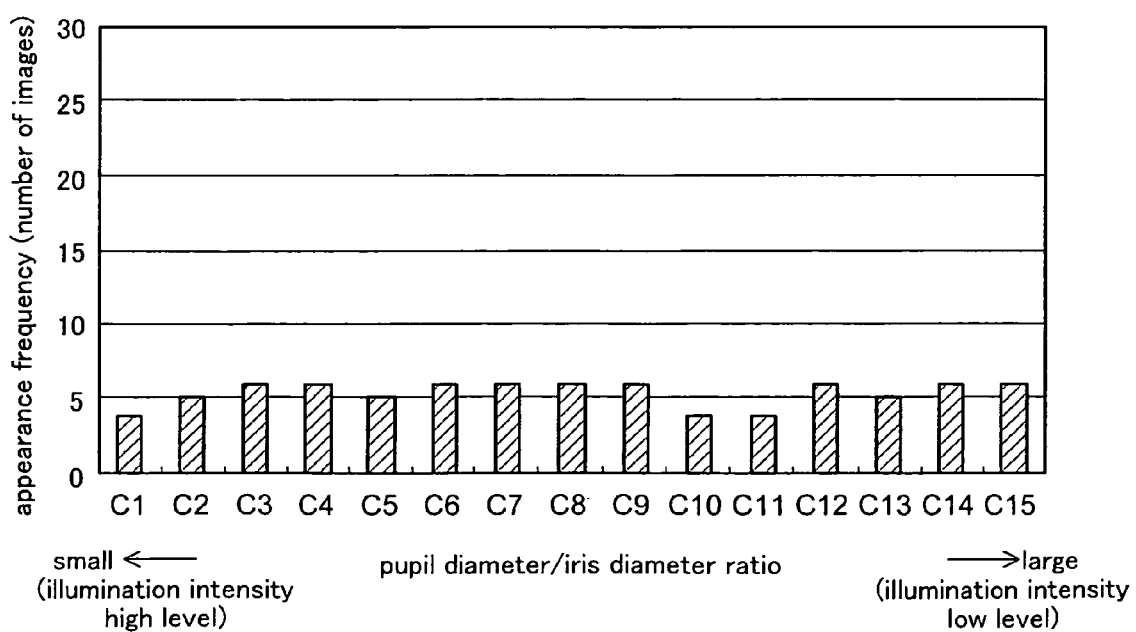

pupil perimeter E1
iris perimeter E2 cut-out iris region r θ polar coordinate system

FIG.11
(a) 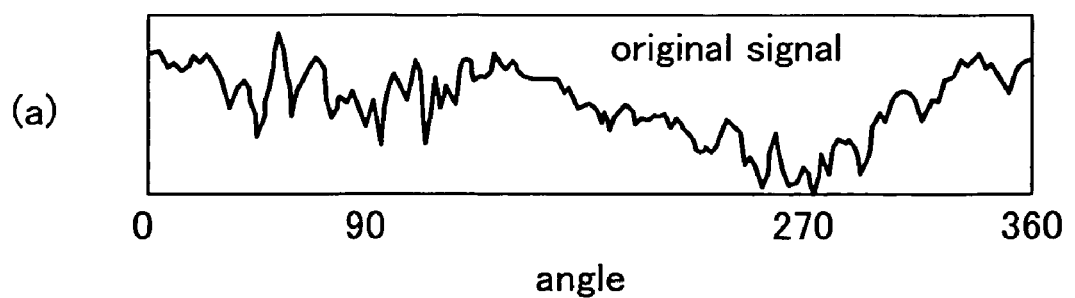
(b) 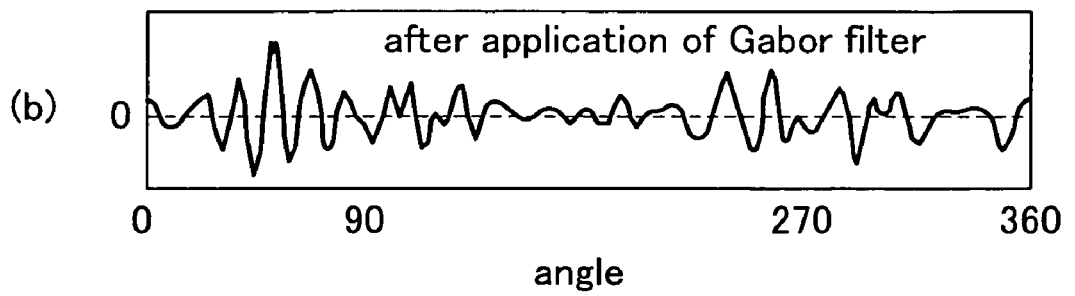
(c) 
angle 14B iris registration apparatus

US 7,623,686 B2

TECHNIQUES AND APPARATUS FOR INCREASING ACCURACY OF IRIS AUTHENTICATION BY UTILIZING A PLURALITY OF IRIS IMAGES

CROSS REFERENCE TO RELATED APPLICATIONS

This is a continuation of Application PCT/JP2005/008219 filed on Apr. 28, 2005. This Non-provisional application claims priority under 35 U.S.C. §119(a) on Patent Application No. 2004-139778 filed in Japan on May 10, 2004, the entire contents of which are hereby incorporated by reference.

BACKGROUND ART

The present invention relates to a personal authentication technique utilizing iris images, and more particularly relates to a technique for increasing accuracy of iris authentication in various situations such as under external light such as sunlight, in the night, and the like.

In recent years, a personal authentication technique utilizing iris images has been started to be used for entrance/exit management in a restricted building, bank ATMs (Automated Teller Machines), PC login applications, and the like. The iris, which has a complicated pattern, provides a very small false acceptance rate, showing applicability to special purposes requiring higher security levels. Nevertheless, the size of the pupil varies depending on ambient brightness, accompanying variation in iris pattern to invite increase in false rejection rate in the case where a lighting condition is largely different between at the time of registration and at the time of authentication. How to absorb the difference in iris pattern between at the time of registration and at the time of authentication is one of keys to reduction to practice.

Patent Document 1 discloses a principal method of iris authentication for identifying an individual by comparing iris image information obtained at the time of authentication with stored iris image information. In this method, an eye is illuminated while controlling the intensity of an illumination so that the pupil reaches a predetermined diameter size, and then, iris images or features extracted from the iris images are compared.

In Patent Document 2, a plurality of iris images in which pupil diameters are made different by changing the intensity of an illumination are taken at the time of registration, and a plurality of features extracted from the respective taken iris images are registered. Then, a feature extracted from an iris image taken at the time of authentication is compared with the plurality of registration features.

In Patent Document 3, various variations (pupil diameter, distortion, partition error) are provided at the time of registration to generate multiple feature data, and some thereof are selected to be registered.

Patent Document 1: Japanese Patent Publication No. 5-84166B
Patent Document 2: Japanese Patent Application Laid Open Publication No. 2000-194855A
Patent Document 3: Japanese Patent Application Laid Open Publication No. 2001-167279A

SUMMARY OF THE INVENTION

Problem that the Invention is to Solve

In Patent Document 1, it takes some time to allow the pupil to reach the predetermined diameter size, thereby taking time for authentication. In contrast, in Patent Document 2, a plurality of iris images in which pupil diameters are different are taken at the time of registration, so that an iris image with any pupil diameter size at the time of authentication can be compared with a registration feature having almost the same pupil diameter size. This eliminates the need to control the pupil diameter at the time of authentication, resulting in reduction of time required for authentication, compared with that in Patent document 1.

Referring to the aforementioned Patent Document 2, it mentions that a plurality of iris images are taken while the intensity of the illumination is changed and the respective features extracted from the taken images are registered, but is silent about the number of features to be registered and the selection method thereof.

The use of a larger number of registration features increases authentication performance while increasing the capacity of a database for holding the registration features and authentication time. To the contrary, the use of a less number of registration features involves no problem of the database capacity and the authentication time, but may invite, depending on a selected registration feature, lowering of the authentication performance caused due to difference in pupil opening between at the time of registration and at the time of authentication. In short, how to obtain an appropriate number of registration features, in view of the database capacity and the authentication time, so as to attain sufficient authentication accuracy is one of keys to reduction to practice in the iris authentication.

The present invention has been made in view of the above problems and has its objective of providing a technique for registering features so as to attain stable authentication performance in personal authentication utilizing iris images.

Means of Solving the Problems

In the first invention, aggregation of iris images of a person to be registered of which distribution of pupil openings is uniform is acquired and a predetermined number of registration features are obtained from the aggregation of the iris images while the authentication performance is evaluated.

In this invention, while the authentication performance is evaluated, the registration features are selected from the aggregation of the iris images of which distribution of the pupil openings is uniform, thereby attaining stable authentication performance even for any iris image with any pupil opening taken at the time of authentication under a variety of brightness.

Further, the aggregation of the iris images of which distribution of the pupil openings is uniform may be acquired by performing at least one of duplication and deletion of at least one iris image of the plurality of iris images so that the distribution of the pupil opening becomes uniform. Also, the plurality of iris images may be acquired by shooting while the illumination intensity is controlled so that the distribution of the pupil openings becomes uniform. In addition, the plurality of iris images may be acquired by shooting while the illumination intensity is changed and shooting intervals are controlled so that the distribution of the pupil openings becomes uniform.

In the second invention, aggregation of iris images of a person to be registered in which pupil openings present a predetermined distribution is acquired by performing at least one of duplication and deletion of at least one iris image of the plurality of iris images and a predetermined number of registration features are obtained from the aggregation of the iris images while authentication performance is evaluated. Then, a distribution of pupil openings in a plurality of iris images acquired under a condition that the person to be registered performs authentication is set as the predetermined distribution.

In this invention, the aggregation of the iris images in which the pupil openings present the predetermined distribution according to, for example, the lifestyle of the person to be registered is acquired to obtained the predetermined number of registration features from the aggregation of the iris images while the authentication performance is evaluated. Hence, the registration features matched with the lifestyle of a person to be registered can be obtained, resulting in further stable authentication performance.

In the third invention, features are generated from a plurality of iris images of a person to be registered, respectively, a predetermined number of registration features are selected from the features using authentication performance as an evaluation index, and a predetermined evaluation value indicating authentication performance is calculated by using a weight according to the number of features in each pupil opening in the selection.

In this invention, the registration features are selected with the use of the predetermined evaluation value indicating authentication performance calculated by using a weight according to the number of the features in each pupil opening. Hence, the same registration features as in the first or second invention can be obtained from the plurality of iris images even unless aggregation of iris images of which distribution of pupil openings is uniform or aggregation of iris images in which the pupil openings present a predetermined distribution is acquired in advance.

Effect of the Invention

According to the present invention, registration of features for iris authentication can be performed so as to attain stable authentication performance.

BRIEF DESCRIPTION OF THE DRAWINGS

FIG. 1 is a flowchart depicting an iris registration method according to Embodiment 1 of the present invention.

FIG. 2 is a diagram showing a whole construction of an iris authentication system in each embodiment of the present invention.

FIG. 4 is a view showing an external appearance of a mobile phone having an authentication function as one example of an iris authentication apparatus.

FIG. 5 is a histogram showing one example of a distribution of the numbers of iris images with respect to pupil openings.

FIG. 6 is a histogram showing aggregation of iris images of which distribution of pupil openings is uniform.

FIG. 11 is a graph showing an iris feature generating process.

DESCRIPTION OF PREFERRED EMBODIMENTS

Figure 3:
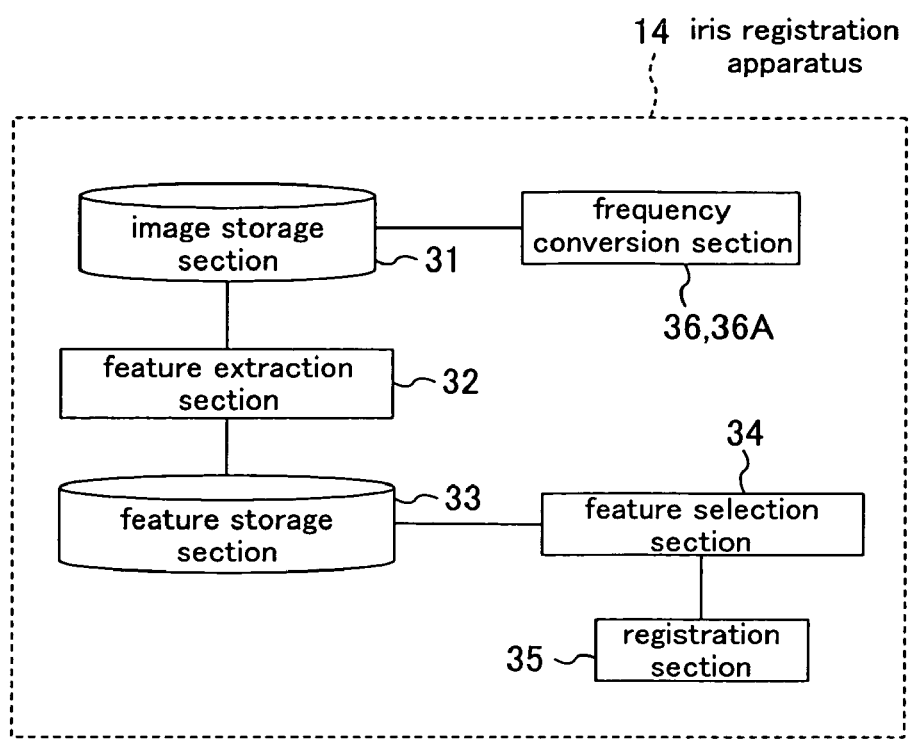
FIG. 3 is a block diagram showing a constitutional example of an iris registration apparatus according to Embodiment 1 of the present invention.

The first aspect of the present invention provides an iris registration method including: a first step of acquiring aggregation of iris images of a person to be registered of which distribution of pupil openings is uniform; and a second step of obtaining, while evaluating authentication performance, a predetermined number of registration features from the aggregation of the iris images which is obtained in the first step.

The second aspect of the present invention provides the iris registration method of the first aspect, wherein the first step includes the steps of: acquiring a plurality of iris images; and performing at least one of duplication and deletion of at least one iris image of the plurality of iris images so that the distribution of the pupil openings becomes uniform.

The third aspect of the present invention provides the iris registration method of the first aspect, wherein the first step includes the step of: shooting a plurality of iris images while controlling illumination intensity so that the distribution of the pupil openings becomes uniform.

The fourth aspect of the present invention provides the iris registration method of the first aspect, wherein the first step includes the step of: shooting a plurality of iris images while changing illumination intensity and controlling shooting intervals so that the distribution of the pupil openings becomes uniform.

The fifth aspect of the present invention provides the iris registration method of the first aspect, wherein the second step includes the steps of: generating features from the respective iris images that belong to the aggregation; and selecting registration features from the features with the use of authentication performance as an evaluation index.

The sixth aspect of the present invention provides an iris registration method, including: a first step of acquiring a plurality of iris images of a person to be registered; a second step of setting a distribution of pupil openings in a plurality of iris images acquired under a condition that the person to be registered performs authentication; a third step of acquiring aggregation of iris images in which the pupil openings present the distribution set in the second step by performing at least one of duplication and deletion of at least one iris image of the plurality of iris images acquired in the first step; and a fourth step of obtaining, while evaluating authentication performance, a predetermined number of registration features from the aggregation of the iris images which is obtained in the third step.

The seventh aspect of the present invention provides the iris registration method of the sixth aspect, wherein the fourth step includes the steps of: generating features from the respective iris images that belong to the aggregation; and selecting registration features from the features with the use of authentication performance as an evaluation index.

The eighth aspect of the present invention provides the iris registration method of the fifth or seventh aspect, wherein in the feature generation step, when there is an iris image obtained by duplication, the feature is generated by slightly displacing a cut-out position of an iris region of the iris image from a cut-out position of an original image.

The ninth aspect of the present invention provides the iris registration method of the fifth or seventh aspect, wherein in the feature selection step, X registration features are selected from M features, wherein M is an integer larger than 1 and X is an integer equal to or larger than 1 and equal to or smaller M in such a manner that: X features are temporarily selected from the M features, authentication for remaining (M-X) features is performed on the assumption that the X features are registered, and evaluation for obtaining a predetermined evaluation value indicating authentication performance is executed iteratively while temporarily selected X features are changed; and the X registration features are determined based on the predetermined evaluation value obtained through the iteration of the evaluation.

The tenth aspect of the present invention provides the iris registration method of the ninth aspect, wherein the predetermined evaluation value is a false rejection rate or a statistical value of distances between features at the time of authentication.

The eleventh aspect of the present invention provides the iris registration method of the sixth aspect, wherein in the second step, the distribution is set with the use of a distribution of pupil openings which is obtained from past authentication history of the person to be registered.

The twelfth aspect of the present invention provides the iris registration method of the sixth aspect, wherein in the second step, the person to be registered sets the distribution.

The thirteenth aspect of the present invention provides an iris registration method, including: a first step of acquiring a plurality of iris images of a person to be registered; a second step of generating features from the respective iris images obtained in the first step; and a third step of selecting from the features obtained in the second step a predetermined number of registration features, using authentication performance as an evaluation index, wherein in the third step, a predetermined evaluation value indicating authentication performance is calculated by using a weight according to the number of features in each pupil opening, and the registration features are selected using the thus calculated evaluation value.

The fourteenth aspect of the present invention provides the iris registration method of the thirteenth aspect, further including: a fourth step of setting a distribution of pupil openings in a plurality of iris images acquired under a condition that the person to be registered performs authentication, wherein in the third step, the predetermined evaluation value is calculated taking the distribution set in the fourth step into consideration.

The fifteenth aspect of the present invention provides the iris registration method of the fourteenth aspect, wherein in the fourth step, the distribution is set with the use of a distribution of pupil openings which is obtained from past authentication history of the person to be registered.

The sixteenth aspect of the present invention provides the iris registration method of the fourteenth aspect, wherein in the fourth step, the person to be registered sets the distribution.

The seventeenth aspect of the present invention provides an iris registration apparatus, including: an image storage section that stores a plurality of iris images of a person to be registered; a frequency conversion section that performs at least one of duplication and deletion of at least one iris image of the plurality of iris images stored in the image storage section so that pupil openings presents a predetermined distribution; and a registration feature generation section that generates, while evaluating authentication performance, a predetermined number of features from the plurality of iris images stored in the image storage section.

The eighteenth aspect of the present invention provides an iris registration apparatus, including: an image storage section that stores aggregation of iris images of a person to be registered; a feature extraction section that generates features from the respective iris images stored in the image storage section; and a feature selection section that selects a predetermined number of registration features from the features generated by the feature extraction section, using authentication performance as an evaluation index, wherein the feature selection section calculates a predetermined evaluation value indicating authentication performance by using a weight according to the number of features in each pupil opening, and selects the registration features using the thus calculated evaluation value.

The nineteenth aspect of the present invention provides an iris registration apparatus, including: an image acquisition section that acquires aggregation of iris images of a person to be registered by shooting; an image storage section that stores the aggregation of the iris images which is acquired by the image acquisition section; and a registration feature generation section that generates, while evaluating authentication performance, a predetermined number of registration features from the aggregation of the iris images which is stored in the image storage section, wherein the image acquisition section includes: an illumination section of which illumination intensity is variable; and a shooting section capable of shooting images successively, and the shooting section shoots a plurality of iris images while the illumination intensity of the illumination section is controlled so that pupil openings present a predetermined distribution.

The twentieth aspect of the present invention provides an iris registration apparatus, including: an image acquisition section that acquires aggregation of iris images of a person to be registered by shooting; an image storage section that stores the aggregation of the iris images which is acquired by the image acquisition section; and a registration feature generation section that generates, while evaluating authentication performance, a predetermined number of registration features from the aggregation of the iris images which is stored in the image storage section, wherein the image acquisition section includes: an illumination section of which illumination intensity is variable; and a shooting section capable of shooing images successively, and the shooting section shoots a plurality of iris images while the illumination intensity of the illumination section is changed chronologically and shooting intervals are controlled so that pupil openings present a predetermined distribution.

The twenty-first aspect of the present invention provides an iris registration program that allows a computer to execute: a first step of acquiring aggregation of iris images in which pupil openings present a predetermined distribution by performing at least one of duplication and deletion of at least one iris image of a plurality of iris images; and a second step of generating, while evaluating authentication performance, a predetermined number of registration features from the aggregation of the iris images which is obtained in the first step.

The twenty-second aspect of the present invention provides an iris registration program that allows a computer to execute: a first step of generating features respectively from a plurality of iris images; and a second step of selecting a predetermined number of registration features from the features generated in the first step, using authentication performance as an evaluation index, wherein in the second step, a predetermined evaluation value indicating authentication performance is calculated by using a weight according to the number of features in each pupil opening and the registration features are selected with the use of the thus calculated evaluation value.

The embodiments of the present invention will be described below with reference to the drawings.

Embodiment 1

FIG. 1 is a flowchart depicting an iris registration method according to Embodiment 1 of the present invention. The processes in FIG. 1 are executed in an iris registration apparatus 14 described later. Steps SA0 and SA1 correspond to a first step and steps SA2 and SA3 correspond to a second step.

FIG. 2 shows a whole construction of an iris authentication system according to the present embodiment. In FIG. 2, an iris authentication server 11 includes an iris database 12 for storing an iris feature of at least one person to be registered, and is connected to a network 13 such as internet, an exclusive line, a public line, and the like. As well, the iris registration apparatus 14 and an iris authentication apparatus 15 are connected to the network 13. The iris registration apparatus 14 sends an iris feature generated at the time of registration to the iris database 12. The iris authentication apparatus 15 performs personal authentication by comparing an iris feature generated at the time of authentication with the iris feature at the time of registration obtained from the iris database 12.

FIG. 3 is a block diagram showing a constitutional example of the iris registration apparatus 14 according to the present embodiment. The iris registration apparatus 14 in FIG. 3 includes: an image storage section 31 that stores a plurality of iris images taken by a shooting device not shown; a feature extraction section 32 that executes a feature extraction step SA2; a feature storage section 33 that stores a feature extracted by the feature extraction section 32; a feature selection section 34 that executes a feature selection step SA3; a registration section 35 that executes a registration step SA4; and a frequency conversion section 36 that executes a frequency uniforming step SA1. The feature extraction section 32, the feature storage section 33, and the feature selection section 34 compose a registration feature generation section.

It is noted that the iris authentication sever 11 may be installed in plural places per region or per organization where it is utilized or may include a plurality of servers including a mirror server for distributing a burden. Further, the iris database 12 may be connected to the iris authentication server 11 via the network 13.

Moreover, it is possible that the iris registration apparatus 14 only takes iris images and sends the thus taken iris images to the iris authentication server 11 and the registration feature is generated in the iris authentication server 11. Also, the iris authentication server 11 may have all functions of the iris registration apparatus 14.

In addition, it is possible that the iris authentication apparatus 15 only takes an iris image for authentication and sends the thus taken iris image to the iris authentication server 11 and a feature for authentication is generated in the iris authentication server 11. It is further possible that comparison with the registration feature is performed in the iris server 11 and the iris authentication apparatus 15 only receives the compared result as an authentication result. Furthermore, the iris authentication apparatus 15 may have all functions of the iris authentication server 11, the iris database 12, and the iris registration apparatus 14 so as to perform registration, feature storage, and authentication by itself.

FIG. 4 is a view showing an external appearance of a mobile phone having an authentication function as one example of the iris authentication apparatus 15 in the present embodiment. The mobile phone 20 having the authentication function in FIG. 4 is a mobile phone to which a camera 21 for iris image taking and an illumination 22 for iris image taking are added. In addition to the camera 21 and the illumination 22, there are provided a monitor 23, operation buttons 24, a speaker 25, a microphone 26, an antenna 27, and the like. The illumination 22 is composed of one or more near-infrared LEDs. The monitor 23 displays an iris image during taking or an authentication result.

In the present embodiment, a person to be authenticated uses the mobile phone having the authentication function as in FIG. 4 to perform iris authentication under various conditions at any place outdoors and indoors and at any time in day and night.

The process for iris registration, that is, the iris registration method according to the present embodiment will be described below with reference to the flowchart of FIG. 1.

First, a person to be registed takes a plurality (N) of iris images in advance (SA0). In this case, for example, a plurality of iris images different in pupil diameter/iris diameter ratio (an index indicating opening of a pupil) are taken under a condition that the intensity of ambient visible light varies. The iris images may be taken by the iris registration apparatus 14, or images taken by another device are sent to the iris registration apparatus 14. The iris images herein may not be uniform in distribution of pupil openings. The thus acquired plurality of iris images are stored in the image storage section 31.

Next, in the frequency uniforming step SA1, an iris image of the plurality of iris images acquired in the step SA0 is duplicated and/or deleted to obtain aggregation of iris images of which frequency is uniform, in detail, of which distribution of the number of images with respect to the pupil diameter/iris diameter ratio is uniform. It can be also said that the aggregation of the iris images is uniform in distribution of pupil openings. This process is performed by the frequency conversion section 36.

FIG. 5 is a histogram showing one example of the distribution of the number of iris images with respect to the pupil diameter/iris diameter ratio. Herein, about 300 iris images are taken successively using a shooting device of which shooting times per time is constant during the time before and after the intensity of the visible light is changed between two stages of "high level" and "low level". C1 to C15 in the axis of abscissas indicate classes of the pupil diameter/iris diameter ratio, respectively, wherein the width between the classes is 0.01. The axis of ordinates indicates appearance frequency (the number of images).

As shown in FIG. 5, when the intensity of the visible light is at "high levels," the pupil is in a miotic state, so that the pupil diameter/iris diameter ratio becomes small. On the other hand, when the intensity of the visible light is switched to the "low level," the pupil gradually changes into a mydriatic state, so that the pupil diameter/iris diameter ratio becomes larger gradually. Because the shooting is continued even after the pupil adapts completely to the "low level" visible light intensity, the frequencies of images having comparatively larger pupil diameter/iris diameter ratios become higher relatively. In other words, the example of FIG. 5 shows eccentric (not uniform) distribution of pupil openings.

As a method for acquiring aggregation of iris images of which pupil openings are uniform from a plurality of iris images, the following method can be contemplated.

1) The minimum value of the frequencies in all the classes is obtained, and an iris image is deleted so that the frequencies in all the classes become the minimum value. In the example in FIG. 5, the frequencies in all the classes are allowed to become the frequency in the class C5 (or C15).

2) A standard frequency is set, and at least one iris image is duplicated and/or deleted so that the frequency of each class becomes the standard frequency. Specifically, an iris image is duplicated in a class in which the frequency is lower than the standard frequency to increase the frequency while an iris image is deleted in a class in which the frequency is higher than the standard frequency to lower the frequency.

FIG. 6 is a histogram showing aggregation of iris images obtained from FIG. 5, of which distribution of pupil openings is uniform. As shown in FIG. 6, it is not necessarily required to strictly uniform the frequencies in all the classes and only what is required is to uniform the frequencies roughly.

Next, in the feature extraction step SA2, a feature is extracted from each iris image (herein the number of images is M (M is a natural number)) belonging to the iris image aggregation acquied in the step SA1 in which the frequencies are uniform. This process is performed by the feature extraction section 32. Any arbitrary method can be employed for the feature extraction, and the method disclosed in Japanese Patent Publication No. 3307936B is employed herein. The outline of the method is as follow.

(1) A pupil perimeter (border between a pupil and an iris) and an iris perimeter (border between the iris and a sclera) are determined to cut out an iris region.

(2) The cut-out iris region is transformed from an xy orthogonal coordinate system to an rθ polar coordinate system.

(3) Analysis bands are determined (division in a radial direction into eight ring parts).

(4) Multi-scale 2-d Gabor filters are applied and signals after output from the Gabor filters are binarized to be used as an iris feature.

Figure 7:
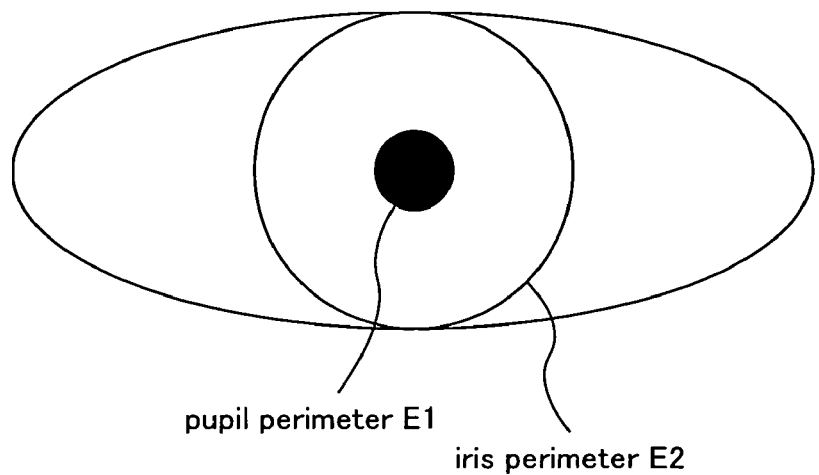
FIG. 7 is a schematic view showing the positions of a pupil perimeter and an iris perimeter.
Figure 8:
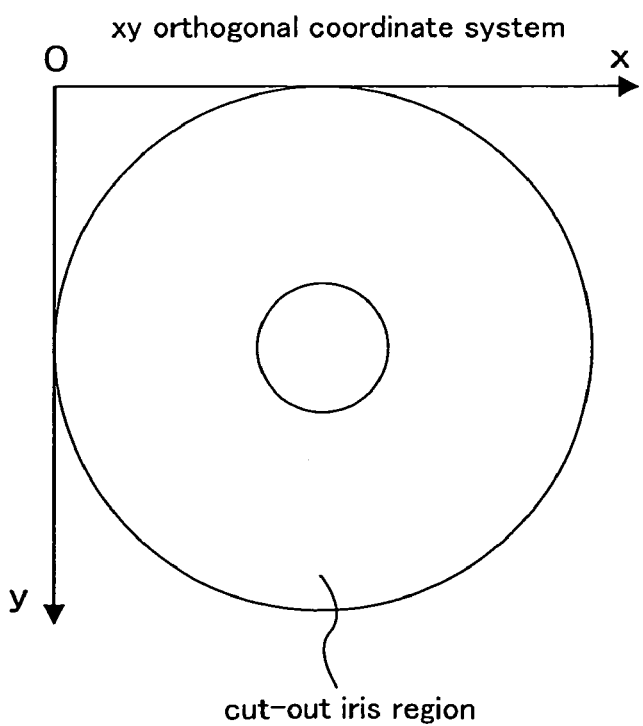
FIG. 8 is a diagram of an iris region expressed in an xy coordinate system.
Figure 9:
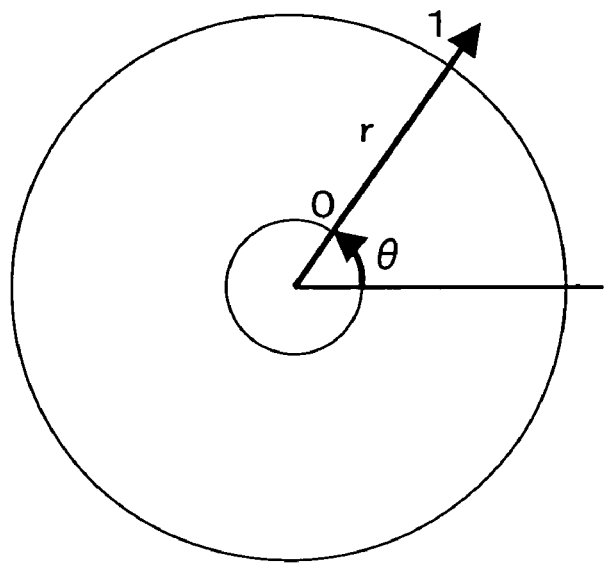
FIG. 9 is a diagram of the iris region expressed in a polar coordinate system.

FIG. 7 is a schematic view showing the positions of the pupil perimeter E1 and the iris perimeter E2, and FIG. 8 is a diagram of a region expressed in the xy coordinate system which is obtained by cutting out a region enclosed by the pupil perimeter E1 and the iris perimeter E2 as an iris region. At the time of this point, influence of translation of the iris region is absorbed. Further, FIG. 9 is a diagram showing the iris region expressed in the rθ polar coordinate system with the pupil center as an origin (transformation from (2)). It is noted that a real pupil perimeter and a real iris perimeter are not exactly perfect circles. Also, when both of them are forced to be approximated to circles, the center of the pupil and the center of the iris do not agree with each other (they are eccentric), but influence of the eccentricity, difference in pupil opening, and expansion/contraction can be absorbed by setting the value in the r direction to be 0 at the pupil perimeter and 1 at the iris perimeter.

Figure 10:
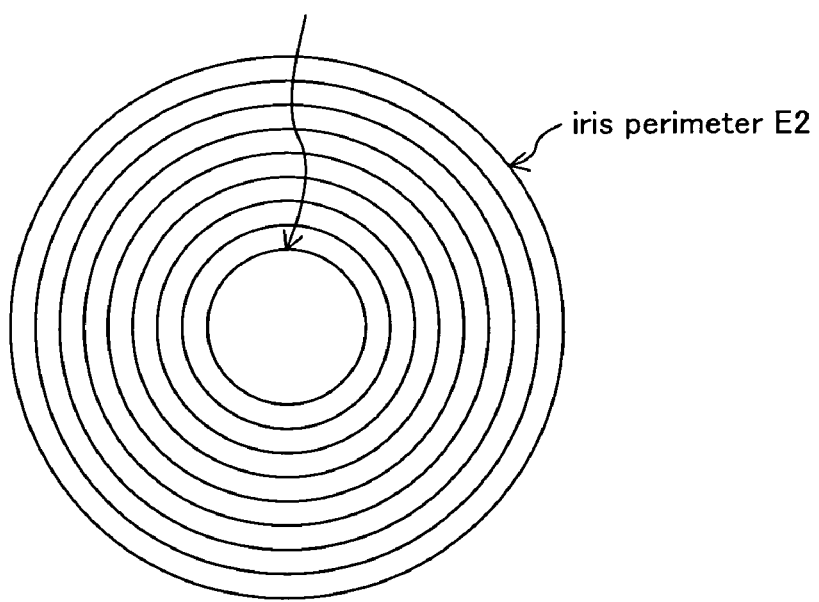
FIG. 10 is a drawing showing analysis bands which are determined by dividing an iris into eight ring parts in a radial direction.

FIG. 10 is a diagram showing the analysis bands in eight ring parts determined in (3), and FIG. 11 shows iris feature generation in (4), wherein the Gabor filter is applied (b) to a luminance signal (a) after determination of the analysis bands in FIG. 10 for binarization (c). Actually, the signal is a two-dimensional signal but is expressed in one dimension for the sake of simple explanation. (a) is an angular orientation luminance signal in one of eight ring parts. Actually, multi-scale Gabor filters are applied (both a real part and an imaginary part are present even if a single-scale Gabor filter is applied), and (b) and (c) are results obtained by applying a real part of a certain single-scale Gabor filter. Each bit position in the iris feature (c) after binarization according to the sign of a Gabor filter output can correspond to a position on the iris image.

In this way, the aforementioned processes (1) to (4) for the plurality (M) of iris images attains, from the iris images, generation of iris features from which influence of translation, expansion/contraction, difference in pupil opening, and eccentricity of the pupil is absorbed. The features obtained herein are stored in the feature storage section 33.

Subsequently, in the feature selection step SA3, X features are selected from the M iris features obtained in the step SA2 as registration features to be finally registered. The number X of registration feature is determined in advance taking account of database capacity, authentication performance tolerable for authentication purpose, and the like. This process is executed by the feature selection section 34.

The selection method is as follow.

X features are selected temporarily from the M features. Then, authentication is performed for the remaining (M-X) features on the assumption that the temporarily selected X features are registered, and a predetermined evaluation value indicating authentication performance is obtained. This evaluation process is executed iteratively while the temporarily selected X features are changed. Based on the evaluation values obtained through iteration of the evaluation process, X registration features are determined. For example, X features that allow authentication performance to be the maximum, namely, X features in which the predetermined evaluation value indicates the best authentication performance are selected finally as the registered features.

Referring to the predetermined evaluation value indicating authentication performance, for example, a false rejection rate at the time of authentication can be used which is expressed as Y/(M-X) wherein the number of false rejection with (M-X) features is Y). Alternatively, a statistical value of hamming distances as distances between features at the time of authentication may be used. As the statistical value, a mean value, a median value, a minimum value, or the like may be used. In the case where the false rejection rate or the distance between features is used as the evaluation value, the authentication performance becomes higher as the evaluation value is smaller.

Through the steps SA2 and SA3, the registration features can be obtained from the iris image aggregation acquired in the step SA1 in which the frequencies are uniform, while the authentication performance is evaluated.

Finally, in the registration step SA4, the registration features selected in the step SA3 are registered. For example, the registration section 35 sends the registration features to the iris authentication server 11 via the network 13. The thus sent registration features are stored in the iris database 12.

Figure 12:
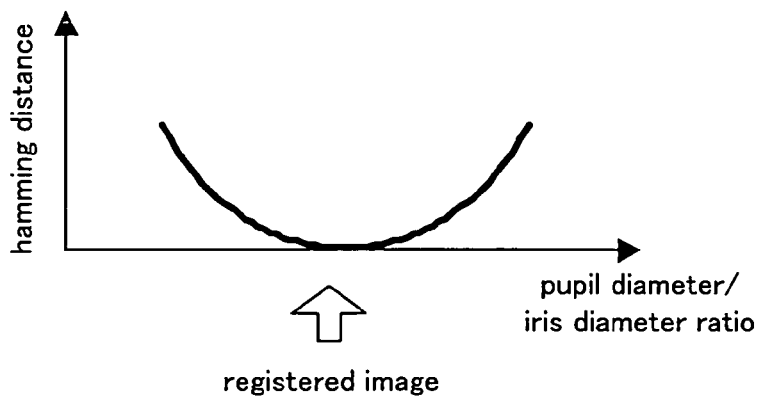
FIG. 12 is a graph schematically showing the relationship between a hamming distance and a difference in pupil diameter/iris diameter ratio.

Herein, the characteristics of the registration features obtained according to the present embodiment will be described with reference to FIG. 12 to FIG. 14.

When the pupil opening changes, the iris pattern changes in association. For this reason, in authentication using a certain registered image, the hamming distance becomes the smallest when the pupil diameter/iris diameter ratio of the iris image used for authentication is the same as that of the registered image while the hamming distance increases as the difference from the registered image in pupil diameter/iris diameter ratio becomes larger, as shown in FIG. 12. The degree of the increase in hamming distance depends on individual difference. Also, strictly speaking, the degree is different depending on the pupil diameter/iris diameter ratio of a registered image even if individuals (eyes) are the same.

Figure 13:
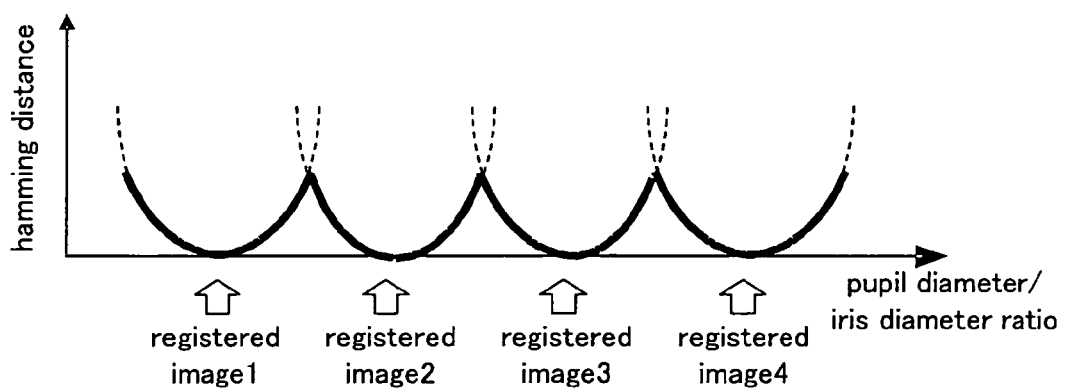
FIG. 13 is a graph schematically showing an example of a distribution of pupil openings of registered images obtained according to Embodiment 1 of the present invention.

In the case where the degrees of the increase in hamming distance are the same regardless of the pupil diameter/iris diameter ratio of the registered images, the pupil diameter/iris diameter ratios of the original iris images of the registration features obtained according to the present embodiment are at almost regular intervals, as shown in FIG. 13. This is because feature registration at regular intervals as in FIG. 13 attains the highest average of authentication performance.

Figure 14:
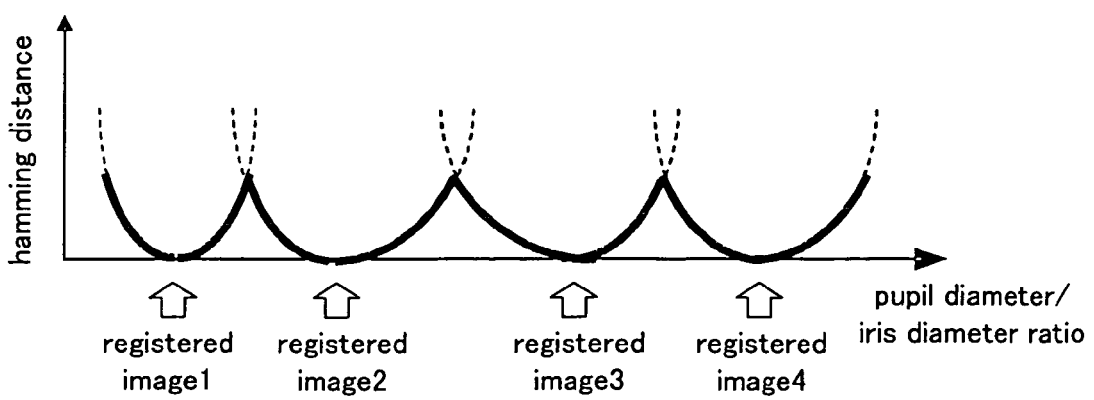
FIG. 14 is a graph schematically showing another example of a distribution of pupil openings of registered images obtained according to Embodiment 1 of the present invention.

On the other hand, in the case where the degrees of the increase in hamming distance are different according to the pupil diameter/iris diameter ratios of the registered images, the pupil diameter/iris diameter ratios of the original iris images of the registration features obtained according to the present embodiment are not necessarily at regular intervals, as shown in FIG. 14.

When the predetermined number of registration features are obtained from the aggregation of the iris images of which the distribution of the pupil openings is uniform while the authentication performance is evaluated as in the present embodiment, the authentication accuracy increases to the maximum with the use of a limited number of features even in the case shown in FIG. 13 or in the case shown in FIG. 14.

Wherein, in the case where an iris image is duplicated for uniforming the distribution of the number of the iris images in the aggregation in the step SA1, just the same features are extracted from the duplicated iris image and the original iris image. In this case, for example, when the feature obtained from the duplicated iris image is temporarily selected in the step SA3, there is a possibility that the evaluation value indicating authentication performance becomes a value better than a value of actually estimated performance. This may result in inappropriate feature selection.

In this connection, when there is an iris image obtained by duplication, it is preferable to generate a feature by displacing a cut-out position (the pupil perimeter and the iris perimeter) of the iris region in the duplicated iris image slightly from the cut-out position in the original iris image. Specifically, for example, some or all of six parameters of the center coordinates (x, y) expressing the circles fitted respectively to the pupil perimeter and the iris perimeter and their radii r may be slightly displaced. Thus, a feature quite different from that of the original iris image can be generated from the duplicated iris image.

Further, the process for authentication will be described briefly.

First, the person to be registered takes an iris image using the iris authentication apparatus 15. Herein, in the case where a portable device such as the mobile phone 20 having the authentication function as in FIG. 4 is used as the iris authentication apparatus 15, authentication can be performed at any place and at any time. An image of an iris in a miotic state is taken outdoors in daytime while an image of an iris in a mydriatic state is taken in night time or under dark illumination.

Then, a feature is extracted from the taken iris image. The process herein is the same as in the step SA2 at the time of registration, and the description is omitted.

Figure 15:
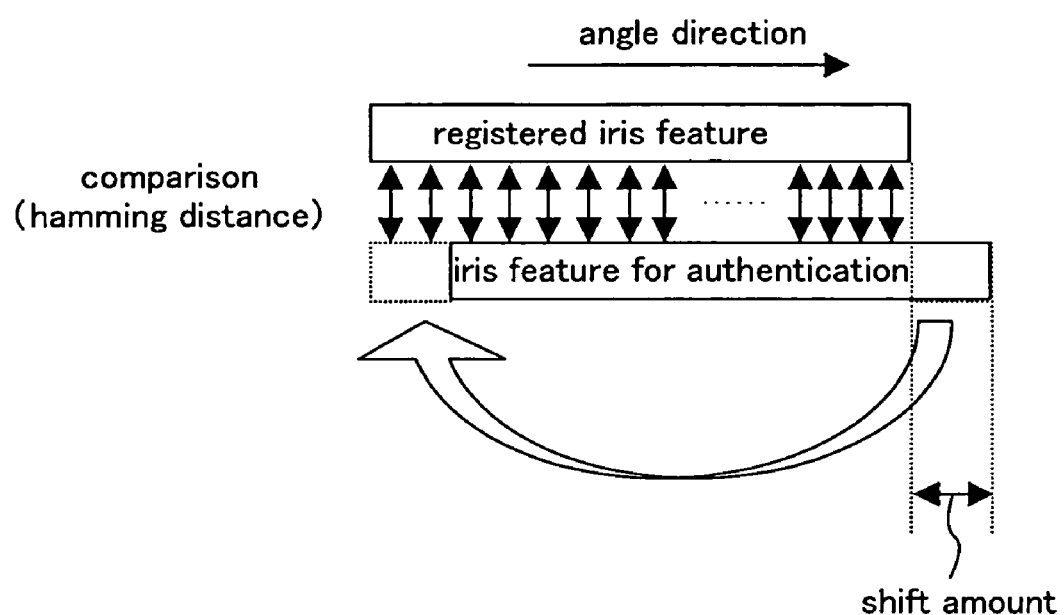
FIG. 15 is a diagram showing a method for comparing features.

Subsequently, authentication is performed by comparing the feature extracted at the time of authentication with the registration feature. The registration feature is sent from the iris database 12 to the iris authentication apparatus 15 via the network 13. In order to compensate influence of face inclination and whirl movement of the eye ball of the subject person, comparison is performed while the features are shifted in an angle direction relatively, as shown in FIG. 15. Then, the hamming distance with the shift that allows the hamming distance to become the minimum value is output as the compared result.

In the case where one to one authentication for reporting an ID of a person to be authenticated, every registration feature having the corresponding ID among the registration features is compared to output the minimum value of the hamming distance as an authentication result. The authentication is performed according to whether the hamming distance of the authentication result is larger than a threshold value or not. The person to be authenticated is judged as another person when it is equal to or larger than the threshold value while being judged as a registrant when it is smaller than the threshold value.

On the other hand, in the case where one to N authentication not for reporting an ID of a person to be authenticated, comparison with every registration feature is performed to output the minimum value of the hamming distance as an authentication result. The authentication is performed according to whether the hamming distance of the authentication result is larger than a threshold value or not. The person to be authenticated is judged as a non-registrant when it is equal to or larger than the threshold value while being judged as a registrant when it is smaller than the threshold value.

Wherein, the example in which the processes until the authentication are performed in the iris authentication apparatus 15 has been described here but the following process may be performed instead. Namely, the processes until the feature extraction are performed in the iris authentication apparatus 15 to send the extracted feature to the iris authentication server 15, and the feature data obtaining and the authentication are performed in the iris authentication server 11.

As described above, in the present embodiment, while the authentication performance is evaluated, the predetermined number of registration features are obtained from the aggregation of the iris images of which distribution of the pupil openings is uniform. Whereby, stable authentication performance can be attained regardless of the pupil opening of the iris image used for authentication. Further, duplication and/or deletion of at least one iris image attains uniformity in distribution of the pupil openings to obtain the above-described effects even if the plurality of taken iris images are not uniform in distribution of the pupil openings.

MODIFIED EXAMPLE

Even unless the step SA1 in the aforementioned embodiment is executed, the predetermined number of registration features may be obtained from aggregation of iris images of which distribution of pupil openings is not necessarily uniform so as to increase the authentication performance averagely. Specifically, the processes in which a feature is extracted from each iris image and registration features are selected using authentication performance as the evaluation standard are the same as in the above embodiment, wherein the predetermined evaluation value indicating authentication performance is calculated by normalization according to the number of features in each pupil opening. Whereby, the same effects as in the above embodiment can be obtained.

Suppose that N features have been extracted. Then, X features are selected temporarily from the N features and the authentication performance of the remaining (N-X) features is computed on the assumption that the temporarily selected X features are registered.

Suppose that the number of classes into which the pupil diameter/iris diameter ratio is divided is C, the number of features that belong to a class Ci is Ni, the number of false rejection that belongs to the class Ci at the time of authentication under the condition that the X features are temporarily registered is FRi, and the j-th hamming distance in the class Ci is HDij. Here is Expression 1.

$$N = \sum_{i=1}^{C} N_i \quad \text{(Expression 1)}$$

For example, in the case where the false rejection rate is used as the evaluation value, the false rejection rate in the class Ci can be expressed as FRi/Ni. When the false rejection rate FRR is obtained by normalization according to the number of features that belong to the class, namely by using a weight of the reciprocal of a frequency, it can be expressed by Expression 2.

$$FRR = \frac{1}{\sum_{i=1}^{C} \frac{1}{N_i}} \sum_{i=1}^{C} \frac{1}{N_i} \frac{FR_i}{N_i} \quad \text{(Expression 2)}$$

Further, in the case where the hamming distance is used as the evaluation value, when the hamming distances HDij (j=1, 2, ..., Ni) of the features included in the class Ci are used for normalization according to the number of features that belong to the class to obtain an average value HD of all hamming distances, it can be expressed by Expression 3.

$$HD = \frac{1}{C} \sum_{i=1}^{C} \frac{1}{N_i} \sum_{j=1}^{N_i} (HD_{ij}) \quad \text{(Expression 3)}$$

In this way, weighting of the reciprocals of the frequencies attains calculation of the evaluation value free from influence of frequency eccentricity in the classes. Hence, the predetermined number of registration features which attains stable authentication performance can be obtained regardless of the pupil opening of the iris image used for authentication.

Figure 16:
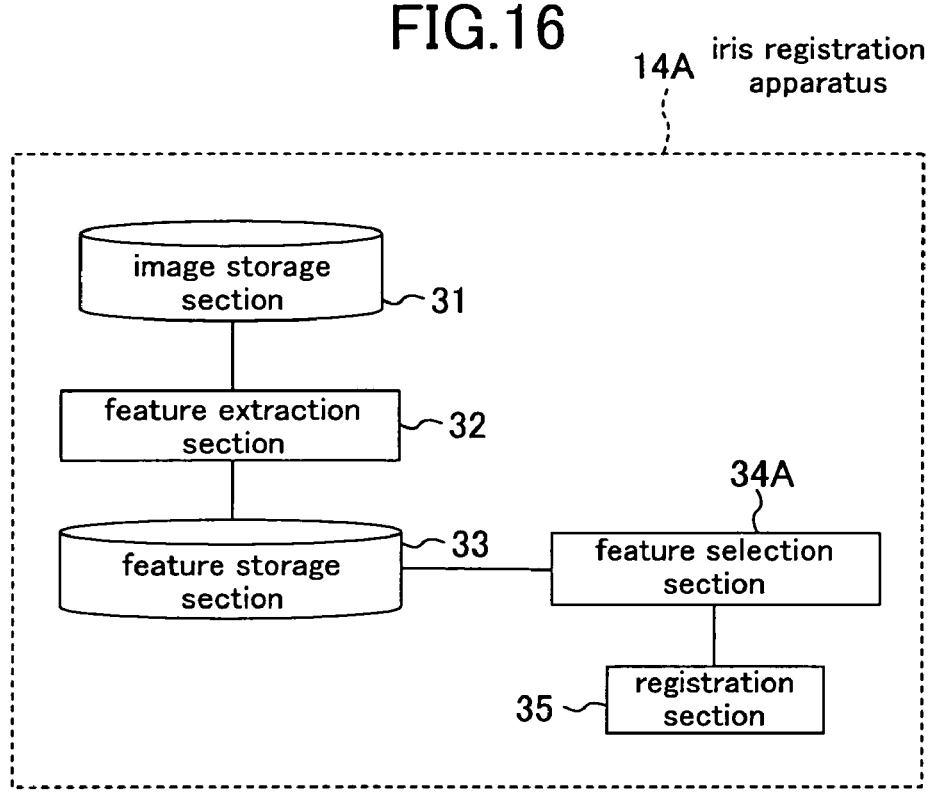
FIG. 16 is a block diagram showing a constitutional example of an iris registration apparatus according to a modified example of Embodiment 1 of the present invention.

FIG. 16 is a block diagram showing a constitutional example of an iris registration apparatus 14A according to the present modified example. The same reference numerals as in FIG. 3 are assigned to elements common to those in FIG. 3, and the detailed description thereof is omitted. In comparison with FIG. 3, the frequency conversion section 36 is omitted. Further, the feature selection section 34A executes the aforementioned registration feature selection process.

Embodiment 2

Figure 17:
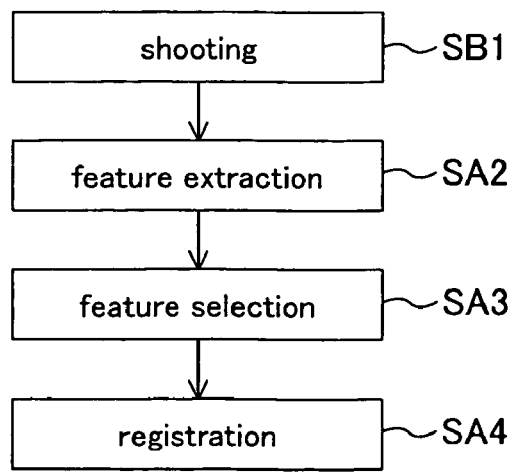
FIG. 17 is a flowchart depicting an iris registration method according to Embodiments 2 and 3 of the present invention.

FIG. 17 is a flowchart depicting an iris registration method according to Embodiment 2 of the present invention. In FIG. 17, the same reference numerals are assigned to steps common to those in FIG. 1. The present embodiment is realized also in the iris authentication system as in FIG. 2, for example. A step SB1 corresponds to the first step.

Figure 18:
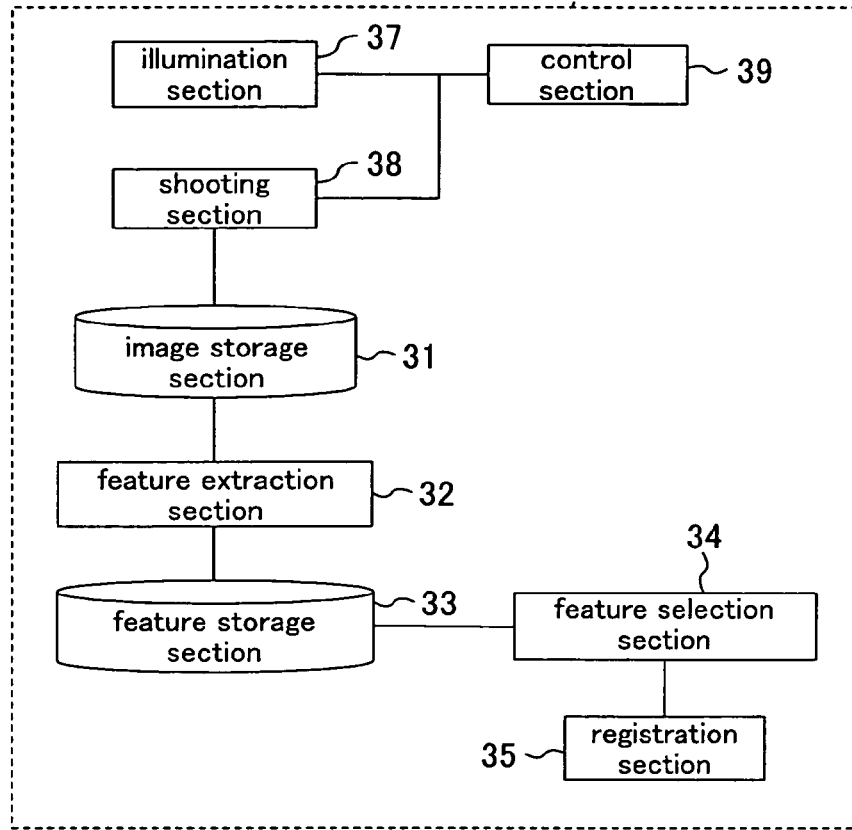
FIG. 18 is a block diagram showing a constitutional example of an iris registration apparatus according to Embodiments 2 and 3 of the present invention.

FIG. 18 is a block diagram showing a constitutional example of an iris registration apparatus 14B according to the present embodiment. In FIG. 18, the same reference numerals are assigned to elements common to those in FIG. 3. In comparison with FIG. 3, the frequency conversion section 36 is omitted while there are provided an illumination section 37 which irradiates visible light and which is composed so that the illumination intensity is controllable, a shooting section 38 capable of shooting images successively, and a control section 39 that controls the illumination section 37 and the shooting section 38. The illumination section 37, the shooting section 38, and the control section 39 compose an image acquisition section to execute a shooting step SB1.

The process for iris registration, namely, the iris registration method according to the present embodiment will be described below with reference the flowchart of FIG. 17.

First, in the shooting step SB1, the person to be registered shoots a plurality of iris images. At that time, the illumination intensity is controlled so that a distribution of pupil openings becomes uniform.

For example, the illumination section 37 is supposed to be capable of setting the illumination intensity to plural stages (P stages) L1 to LP. The pupil diameter/iris diameter ratio is classified into P classes C1 to CP corresponding to the illumination intensities L1 to LP in advance and the number of iris images per class is determined in advance. Then, successive shooting is started at the first illumination intensity L1 and the pupil diameter/iris diameter ratio is calculated for each shot image. An iris image of which pupil diameter/iris diameter ratio is included in the class C1 is stored in the image storage section 31 while an iris image of which pupil diameter/iris diameter ratio is not included therein is not stored but is discarded. When the number of iris images in the class C1 reaches the predetermined number, the illumination intensity is changed to L2 to perform shooting likewise. When the predetermined number of iris images in every class C1 to CP are stored in the image storage section 31, the shooting terminates.

In this way, with the use of the illumination section 37 capable of controlling the illumination intensity, aggregation of iris images of which distribution of pupil openings is uniform can be obtained by shooting.

Thereafter, the feature extraction step SA2, the feature selection step SA3, and the registration step SA4 are executed for the thus obtained aggregation of the iris images. The processes of the steps SA2 to SA4 are the same as those in Embodiment 1, and the description thereof is omitted here.

Further, the operation for authentication is the same as in Embodiment 1, and the description thereof is also omitted.

As described above, in the present embodiment, a distribution of pupil openings can be uniformed in the stage of iris image shooting. This eliminates the need for the frequency uniforming process described in Embodiment 1.

Embodiment 3

In Embodiment 3 of the present invention, aggregation of iris images of which distribution of pupil openings is uniform is obtained by shooting while shooting intervals are controlled rather than controlling the illumination intensity. An iris registration method and an iris registration apparatus according to the present embodiment are the same as those shown in FIG. 17 and FIG. 18, respectively First, in the shooting step SB1, the person to be registered shoots a plurality of iris images. At this time, while the illumination intensity is changed, shooting intervals are controlled so that a distribution of pupil openings becomes uniform. Wherein, the shooting section 38 is set capable of controlling shooting times per time. Also, the illumination section 37 is set capable of controlling the illumination intensity similar to Embodiment 2.

The histogram of previously presented FIG. 5 is obtained from about 300 iris images that are shot successively before and after change in illumination intensity between the two stages of "high level" and "low level" with the use of a shooting device of which shooting intervals are constant. In FIG. 5, the reason why there are many images of which pupil diameter/iris diameter ratios are comparatively large might be that the shooting was continued even after the pupil of the person to be registered has adapted completely to the "low level" visible light intensity. Also, the numbers of iris images of which pupil diameter/iris diameter ratios are comparatively small or in the middle range are not equal. This might be because the pupil opening does not necessarily change linearly in proportion to a lapse of time.

Taking the above into consideration, the pupil diameter/iris diameter ratio is divided into a plurality (P) of classes C1 to CP in advance and the number of iris images per class is determined in advance. In addition, average time variation in pupil diameter per person or in pupil diameters of a plurality of persons is measured in advance according to the illumination intensity control adopted to the shooting. Then, the number of shot images per time is calculated from the time variation in pupil diameter and the classes C1 to CP to control the shooting intervals of the shooting section 38, thus acquiring aggregation of iris images of which distribution of pupil opening is uniform through the shooting.

Thereafter, the feature extraction step SA2, the feature selection step SA3, and the registration step SA4 are executed for the thus obtained aggregation of the iris images. Each process of the steps SA2 to SA4 is the same as in Embodiment 1, and the description thereof is omitted.

Also, the operation for authentication is the same in Embodiment 1, and the description thereof is omitted here.

As describe above, in the present embodiment, a distribution of pupil openings can be uniformed at the time of iris image shooting, eliminating the need for the intensity uniforming process described in Embodiment 1.

Embodiment 4

Figure 19:
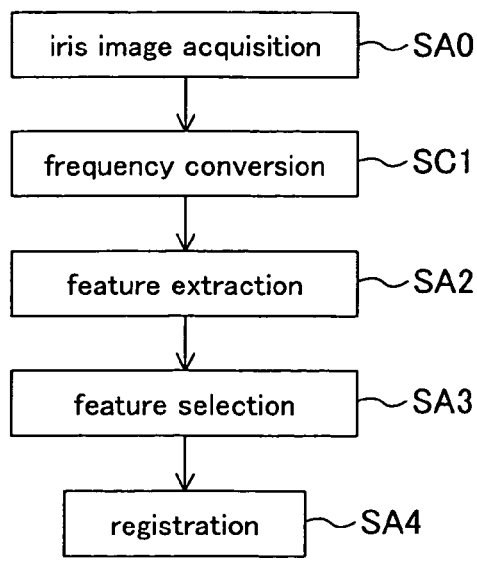
FIG. 19 is a flowchart depicting an iris registration method according to Embodiment 4 of the present invention.

FIG. 19 is a flowchart depicting an iris registration method according to Embodiment 4 of the present invention. In FIG. 19, the same reference numerals are assigned to steps common to those in FIG. 1. The present embodiment is also realized in the iris authentication system as in FIG. 2, for example. Also, it is realized by the iris registration apparatus 14 as shown in FIG. 3. The step SA0 corresponds to the first step, a step SC1 corresponds to the second step and a third step, and the steps SA2 and SA3 correspond to a fourth step.

The process for iris registration, namely the iris registration method according to Embodiment 4 will be described with reference to the flowchart of FIG. 19.

First, the person to be registered acquires in advance a plurality (N) of iris images in which pupil diameter/iris diameter ratios are different (SA0). The iris image acquisition may be performed by the iris registration apparatus 14. Alternatively, the images acquired by another device may be sent to the iris registration apparatus 14. The iris images herein may be or may not be almost uniform in distribution of pupil openings. In other words, any of the image acquisition methods described in Embodiments 1 to 3 can be employed. The thus acquired plurality of iris images are stored in the image storage section 31.

Next, in a frequency conversion step SC1, a distribution of pupil openings of plural iris images acquired under the condition that the person to be registered performs authentication is set. Then, iris images are duplicated and/or deleted from the plural images obtained in the step SA0 to acquire aggregation of iris images of which distribution of the number of images with respect to the pupil diameter/iris diameter ratio becomes the predetermined distribution set as above. It can be said that the aggregation of the iris images presents the predetermined distribution of the pupil openings. This process is executed by a frequency conversion section 36A.

Figure 20:
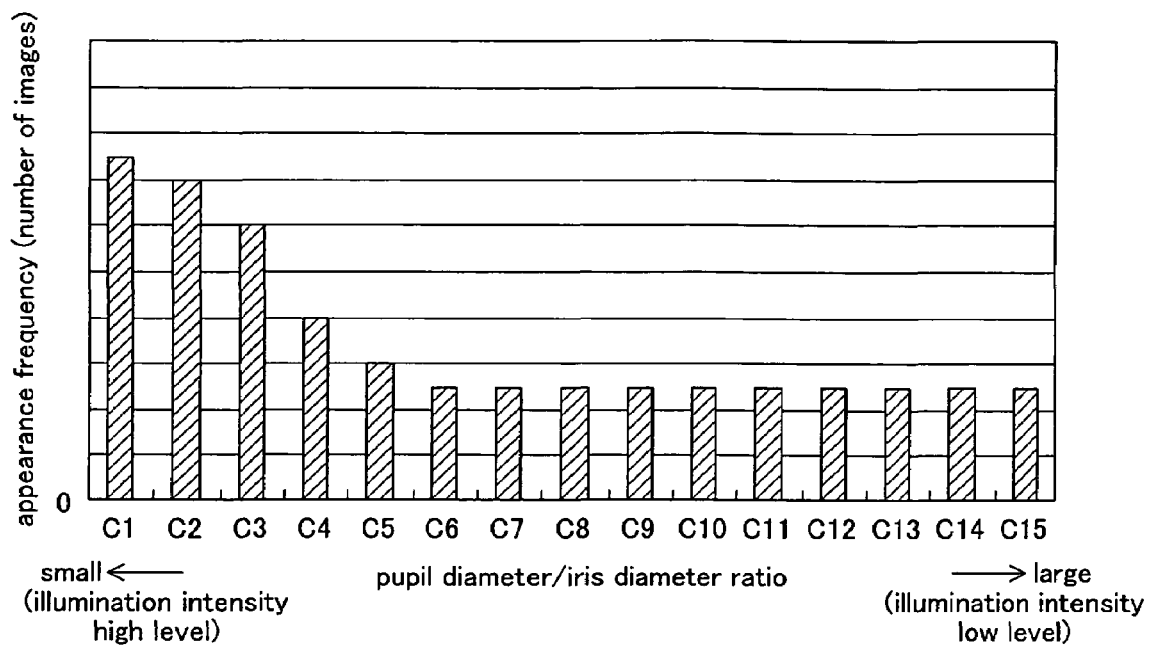
FIG. 20 is a graph schematically showing an example of a distribution of registered images obtained according to Embodiment 4 of the present invention with respect to a pupil diameter/iris diameter ratio.

FIG. 20 is a histogram showing one example of a distribution of the number of iris images with respect to the pupil diameter/iris diameter ratio. In the example shown in FIG. 20, there are comparatively many images of which pupil diameter/iris diameter ratios are small for a person to be registered who often performs iris authentication outdoors. The conversion method herein is the same as in Embodiment 1. For example, the number of iris images is increased by iris image duplication in a class in which the number of iris images is less than a target number while the number of iris images is reduced by iris image deletion in a class in which the number of iris images is larger than the target number.

Figure 21:
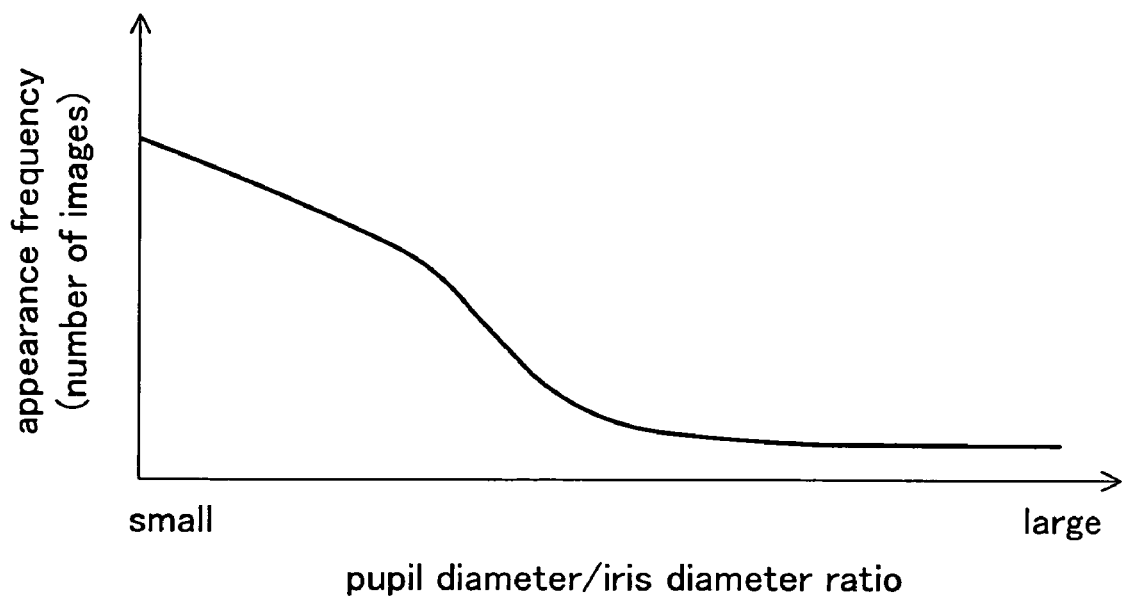
FIG. 21 is a schematic graph showing a day type distribution.
Figure 22:
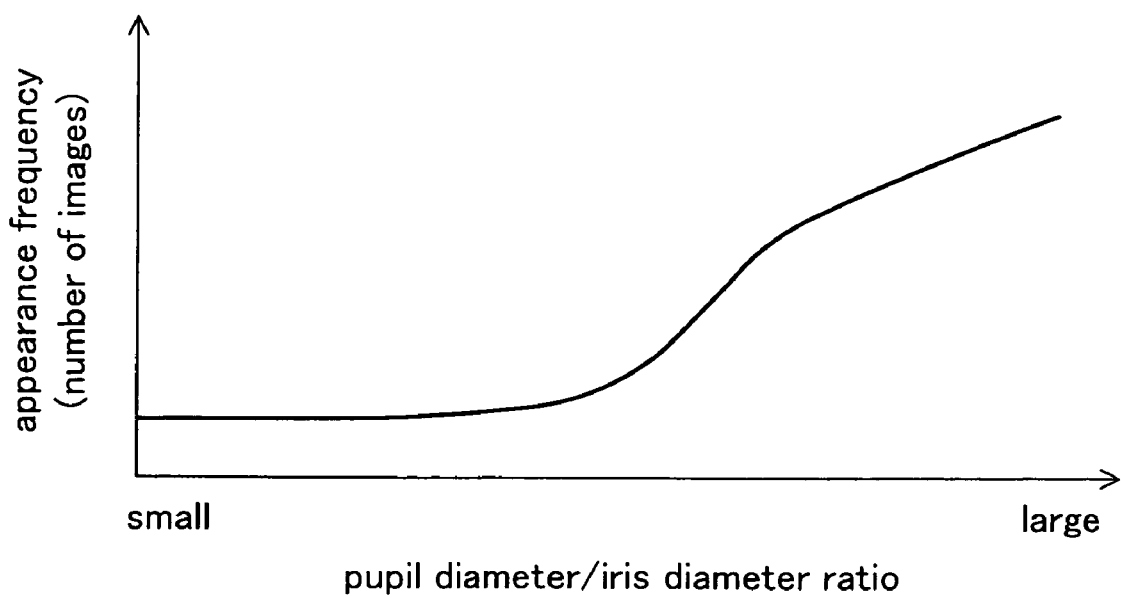
FIG. 22 is a schematic graph showing a night type distribution.
Figure 23:
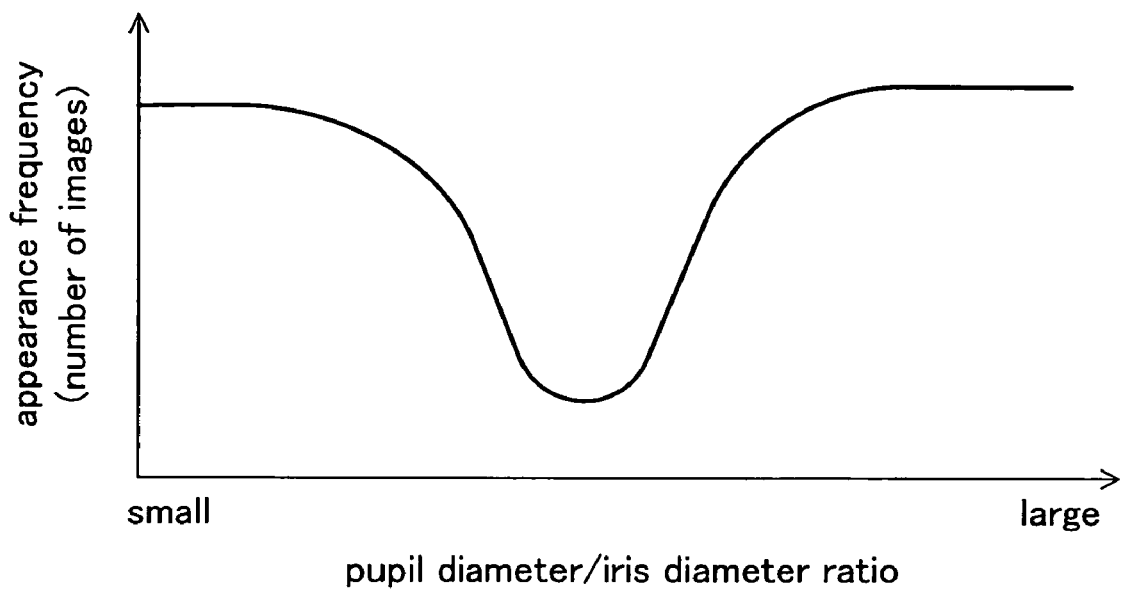
FIG. 23 is a schematic graph showing an outdoor type distribution.
Figure 24:
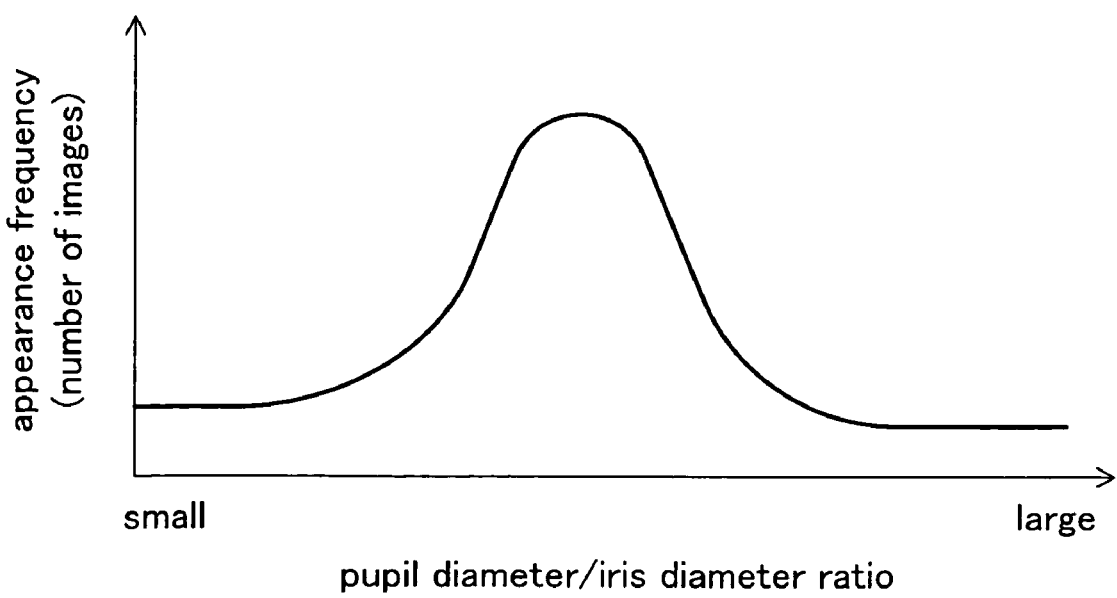
FIG. 24 is a schematic graph showing an indoor type distribution.

Various distributions may be employable as the predetermined distribution. For example, distributions of day type, night type, outdoor type, indoor type, and the like may be prepared in advance on the assumption about a user's lifestyle. As the day type distribution, for example, a distribution in which the frequencies of the classes whose pupil diameter/iris diameter ratios are smaller are larger as in FIG. 21 may be used. Further, as the night type distribution, for example, a distribution in which the frequencies of the classes whose pupil diameter/iris diameter ratios are larger are larger as in FIG. 22 may be used. As the outdoor type distribution that assumes an outdoor situation where it is bright in daytime and is dark in night time, for example, a distribution in which the frequencies of both the classes whose pupil diameter/iris diameter ratios are small and large are larger as in FIG. 23 may be used. As the indoor type distribution that assumes an indoor situation where the middle-level brightness is kept all day long, for example, a distribution in which the frequencies of the classes whose pupil diameter/iris diameter ratios are in the middle levels are larger as in FIG. 24 may be used. Alternatively, an interface that allows the user to select an arbitrary distribution from distributions prepared in advance of day type, night type, outdoor type, indoor type, and the like or from uniform distributions may be used at the time of registration. Further, in addition to the selection from the previously prepared distributions, the person to be registered may input a distribution configuration itself.

Thereafter, the feature extraction step SA2, the feature selection step SA3, and the registration step SA4 are executed for the thus obtained aggregation of the iris images. The processes of the steps SA2 to SA4 are the same as in Embodiment 1 and the description thereof is omitted.

In the case where iris images of which features are to be computed are distributed as in FIG. 20, in the feature selection step SA3, which is the same as in Embodiment 1, images in which the pupil diameter/iris diameter ratios are small are likely to be selected as features to be registered. Hence, outdoor iris authentication performance is especially increased for a person who often performs iris authentication outdoors.

The operation for authentication is the same as in Embodiment 1, and the description thereof is omitted.

As described above, in the present embodiment, while the authentication performance is evaluated, the predetermined number of registration feature can be obtained from the aggregation of the iris images of which distribution of the pupil openings becomes the predetermined distribution that is matched, for example, to the lifestyle of the person to be registered. Whereby, stable authentication performance can be exhibited for iris images acquired under the condition of the lifestyle of the person to be registered. Moreover, duplication and deletion of an iris image allow a distribution of pupil openings to be a predetermined distribution, achieving the above-described effects even with any distribution of pupil openings in a plurality of acquired iris images.

Wherein, storing authentication history enables the use of stored authentication history at the time of next and following registration. The distribution of the number of iris images as in FIG. 20 may be used as the history. In other words, the pupil opening in an iris image acquired at the time of authentication is computed and stored through plural-time authentication operation to obtain the distribution of the number of iris images as in FIG. 20. For example, in the case where the user often performs authentication under the condition that it is bright such as daytime, the frequencies of the classes whose pupil diameter/iris diameter ratios are small become high as in FIG. 20. To the contrary, in the case where the user often performs authentication under the condition that it is dark such as at night time, the frequencies of the classes whose pupil diameter/iris diameter ratios are large become high. Further, registration may be performed again automatically with the use of the distribution configuration obtained from the authentication history when a difference between the distribution configuration used at the time of registration and the distribution configuration obtained from the authentication history becomes larger than a threshold value. In this case, only distribution configuration data obtained from the authentication history is sent to the iris registration apparatus to obtain again registration features with the use of the iris image aggregation stored at the first time registration in the image storage section 31 or the feature aggregation stored in the feature storage section 33 and the distribution configuration obtained from the authentication history. Further, as the history, the registration feature may be extracted from the iris image used for authentication or the feature itself used for authentication may be used as the registration feature, in addition to the use of the distribution of the number of iris images.

Moreover, instead of distribution conversion in the frequency conversion step SC1, the following processes may be performed. Namely, likewise the modified example of Embodiment 1, a weight according to the number of features that belong to the corresponding class is added to the evaluation value in each class, taking account of a desirable distribution, to calculate a total evaluation value. Specifically, the following process is performed, for example.

Suppose that N features have been extracted. X features are selected temporarily from the N features and the authentication performance of the remaining (N-X) features is computed on the assumption that the temporarily selected X features are registered.

Suppose that the number of classes into which the pupil diameter/iris diameter ratio is divided is C, the number of features that belong to a class Ci is Ni, the number of false rejection that belongs to the class Ci at the time of authentication under the condition that the X features are temporarily registered is FRi, and the j-th hamming distance in the class Ci is HDij. Here is Expression 1.

$$N = \sum_{i=1}^{C} N_i \qquad \text{(Expression 1)}$$

For example, in the case where the false rejection rate is used as the evaluation value, the false rejection rate in the class Ci can be expressed as FRi/Ni. When the false rejection rate FRR is obtained by adding a weight Wi to the number Ni of features that belong to the class Ci in the iris images obtained in the step SA0 and the class Ci in the desired distribution, it can be expressed by Expression 4.

$$FRR = \frac{1}{\sum_{i=1}^{C} \frac{W_i}{N_i}} \sum_{i=1}^{C} \frac{W_i}{N_i} \frac{FR_i}{N_i} \qquad \text{(Expression 4)}$$

Figure 25:
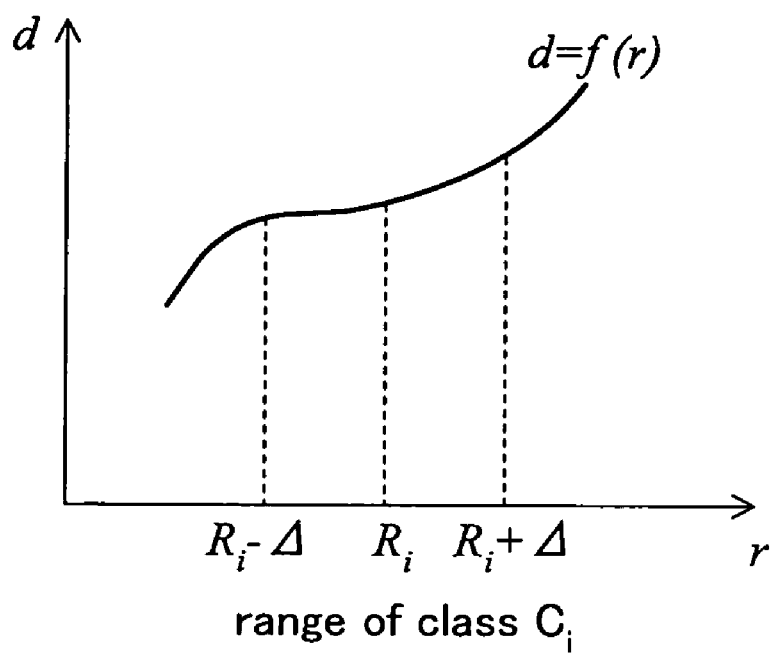
FIG. 25 is a graph schematically showing an example of a distribution of registered images with respect to the pupil diameter/iris diameter ratio.

Herein, in the case where the desired distribution is discrete as in FIG. 20, the frequency of the class Ci can be used as the weight Wi. In the case where the desired distribution is expressed by a continuous function as in FIG. 25, a function value f(Ri) in a representative value Ri of the pupil diameter/iris diameter ratio which represents the class Ci may be used as the weight Wi, for example. As another definition of the weight Wi, a value (Expression 5) obtained by integrating a continuous function f(r) in the range of the pupil diameter/iris diameter ratio corresponding to the class Ci may be employed $$\int_{R_i-\Delta}^{R_i+\Delta} f(r)dr \qquad \text{(Expression 5)}$$

Furthermore, in the case where the hamming distance is used as the evaluation value, when the hamming distances HDij (j=1, 2, . . . , Ni) included in the class Ci are used for adding the weight Wi to the number Ni of features that belong to the class Ci in the iris images acquired in the step SA0 and the class Ci in the desired distribution to obtain an average value HD of all the hamming distances, it can be expressed by Expression 6.

$$HD = \frac{1}{\sum_{i=1}^{C} W_i} \sum_{i=1}^{C} \frac{W_i}{N_i} \sum_{j=1}^{N_i} (HD_{ij}) \qquad \text{(Expression 6)}$$

In this way, addition of the weight Wi to the number Ni of features that belong to the class Ci in the iris images acquired in the step SA0 and the class Ci in the desired distribution removes influence of frequency eccentricity in the classes and enables calculation of the evaluation value corresponding to the desired distribution. Hence, the predetermined number of registration features that attain stable authentication performance under an assumed condition can be obtained regardless of the pupil opening of the iris image used for authentication.

It is noted that a part or all of the steps in the iris registration method according to the present invention may be realized with the used of exclusive hardware or may be realized on software through a program of a computer. In other words, the iris registration method according to the present invention can be realized by a system that includes a computer for executing a program for realizing the method. Alternatively, it can be realized by recording the program for realizing the method to a computer-readable recording medium to allow a computer to execute the program recoded in the recording medium.

The present invention provides a registration method that enables personal authentication in which the false rejection rate is suppressed under various brightness conditions, and therefore is useful for mobile authentication for electronic commerce using, for example, a mobile phone, PDA, and the like having the authentication function.

What is claimed is:

1. An iris registration method, comprising:
at least one processor performing the steps of:
a first step of capturing, by a capture device, a plurality of iris images at different pupil openings of an iris of a person to be registered and storing the plurality of iris images in a computer-readable recording medium;
a second step of acquiring aggregation of iris images by performing at least one of duplication and deletion of at least one iris image of the plurality of iris images in the computer-readable recording medium so that distribution of the number of iris images with respect to the pupil opening is uniform; and
a third step of obtaining, while evaluating authentication performance, a predetermined number of registration features from the aggregation of the iris images which is obtained in the second step and storing the predetermined number of registration features in a computer-readable recording medium, and wherein the third step further includes the steps of:
generating features from the respective iris images that belong to the aggregation; and
selecting a registration feature from the features with the use of authentication performance as an evaluation index, such that X registration features are selected from M features, wherein M is an integer larger than 1 and X is an integer equal to or larger than 1 and equal to or smaller M in such a manner that:
X features are temporarily selected from the M features, authentication for remaining (M-X) features is performed on the assumption that the X features are registered, and evaluation for obtaining a predetermined evaluation value indicating authentication performance is executed iteratively while temporarily selected X features are changed; and the X registration features are determined based on the predetermined evaluation value obtained through the iteration of the evaluation.

2. An iris registration method, comprising:
at least one processor performing the steps of:
a first step of capturing, by a capture device, a plurality of iris images of an iris of a person to be registered and storing the plurality of iris images in a computer-readable recording medium;
a second step of setting a distribution of the number of iris images with respect to pupil opening, acquired under a condition that the person to be registered performs authentication;
a third step of acquiring aggregation of iris images in which the pupil openings present the distribution set in the second step by performing at least one of duplication and deletion of, in the computer-readable recording medium, at least one iris image of the plurality of iris images acquired in the first step; and
a fourth step of obtaining, while evaluating authentication performance, a predetermined number of registration features from the aggregation of the iris images which is obtained in the third step and storing the predetermined number of registration features in a computer-readable recording medium, and wherein the fourth step further includes the steps of:
generating features from the respective iris images that belong to the aggregation; and
selecting registration features from the features with the use of authentication performance as an evaluation index where X registration features are selected from M features, wherein M is an integer larger than 1 and X is an integer equal to or larger than 1 and equal to or smaller M in such a manner that:
X features are temporarily selected from the M features, authentication for remaining (M-X) features is performed on the assumption that the X features are registered, and evaluation for obtaining a predetermined evaluation value indicating authentication performance is executed iteratively while temporarily selected X features are changed; and the X registration features are determined based on the predetermined evaluation value obtained through the iteration of the evaluation.

3. The method of claim 1 or 2, wherein
the predetermined evaluation value is a false rejection rate or a statistical value of distances between features at the time of authentication.

4. The method of claim 1 or 2, wherein in the feature generation step,
when there is an iris image obtained by duplication, the feature is generated by slightly displacing a cut-out position of an iris region of the iris image from a cut-out position of an original image.

* * * * *